US010048946B2

(12) United States Patent
Krishnan et al.

(10) Patent No.: US 10,048,946 B2
(45) Date of Patent: Aug. 14, 2018

(54) CONVERTING VISUAL DIAGRAMS INTO CODE

(71) Applicant: Microsoft Technology Licensing, LLC, Redmond, WA (US)

(72) Inventors: Gowri Krishnan, Redmond, WA (US); Jasneet Bhatti, Hyderabad (IN); Srinivas Guruprasad, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/079,249

(22) Filed: Mar. 24, 2016

(65) Prior Publication Data

US 2017/0277518 A1 Sep. 28, 2017

(51) Int. Cl.
*G06F 9/44* (2018.01)
*G06F 8/34* (2018.01)

(52) U.S. Cl.
CPC ...................... *G06F 8/34* (2013.01)

(58) Field of Classification Search
CPC ... G06F 8/34; G06F 8/35; G06F 17/24; G06F 17/30294; G06F 3/0321; G06F 8/36
See application file for complete search history.

(56) References Cited

U.S. PATENT DOCUMENTS

| | | | |
|---|---|---|---|
| 7,096,454 B2 | 8/2006 | Damm et al. | |
| 7,322,524 B2 | 1/2008 | Silverbrook et al. | |
| 7,324,691 B2 | 1/2008 | Li et al. | |
| 8,086,998 B2 | 12/2011 | Bansal et al. | |
| 8,495,560 B2 | 7/2013 | Dangeville et al. | |
| 8,584,085 B2 | 11/2013 | Kaulgud et al. | |
| 8,607,190 B2 | 12/2013 | Coldicott et al. | |
| 8,656,349 B2 * | 2/2014 | Lochmann | G06F 8/74 104/106 |

(Continued)

OTHER PUBLICATIONS

Grundy,"Supporting generic sketching-based input of diagrams in a domain-specific herein after visual language meta-tool", May 26, 2007, pp. 1-10.*

(Continued)

*Primary Examiner* — Duy Khuong T Nguyen
(74) *Attorney, Agent, or Firm* — Jacob P. Rohwer; Newport IP, LLC

(57) ABSTRACT

The techniques and systems described herein provide a tool for use in association with the development of a computer program. For instance, a computer program development team (e.g., design architects, developers, programmers, coders, etc.) can use the tool to efficiently generate code solutions using an illustrated diagram (e.g., drawn on a dry-erase white board, drawn using a digital drawing program, etc.). In various examples, the tool receives a diagram illustrating the design architecture and performs recognition techniques to identify characteristics of the components illustrated in the diagram. The characteristics can include keywords written on or in association with a component, a visual shape of a component, and a visual relationship between the component and other components illustrated in the design architecture. Using the identified characteristics, the tool maps the components to previously generated code template(s) and provides the code templates to a user.

20 Claims, 6 Drawing Sheets

(56) References Cited

U.S. PATENT DOCUMENTS

| | | |
|---|---|---|
| 8,943,465 B2 | 1/2015 | Broadfoot et al. |
| 9,015,011 B2 | 4/2015 | Sarkar et al. |
| 2008/0082959 A1* | 4/2008 | Fowler ............... G06F 8/24 717/104 |
| 2010/0083223 A1* | 4/2010 | Chouinard .......... G05B 19/056 717/110 |
| 2011/0088011 A1* | 4/2011 | Ouali ............... G06F 8/10 717/105 |
| 2011/0137872 A1* | 6/2011 | Coldicott .......... G06F 17/30294 707/665 |
| 2013/0055195 A1* | 2/2013 | Weigert ............. G06F 8/10 717/104 |
| 2013/0097583 A1 | 4/2013 | Kung |
| 2014/0282369 A1 | 9/2014 | Pressley et al. |
| 2015/0294039 A1 | 10/2015 | Arbel et al. |
| 2016/0041815 A1* | 2/2016 | Bhagat ............... G06F 8/36 717/107 |
| 2016/0239751 A1* | 8/2016 | Mosterman ........... G06N 7/005 |
| 2017/0185384 A1* | 6/2017 | Sankaranarasimhan ............... H04W 4/003 |

OTHER PUBLICATIONS

Mittal, "Introducing IBM Rational Software Architect", retrieved on Dec. 29, 2015, available at <<http://www.ibm.com/developerworks/rational/library/05/kunal/>>, Feb. 15, 2005, 8 pages.

Xu et al., "Reverse engineering UML class and sequence diagrams from Java code with IBM Rational Software Architect", available at <<http://www.ibm.com/developerworks/rational/library/08/0610_xu-wood/0610_xu-wood-pdf.pdf>>, Jun. 10, 2008, 16 pages.

\* cited by examiner

CONVERTING VISUAL DIAGRAMS INTO CODE

BACKGROUND

Typically, when a computer program development team (e.g., one or more design architects, developers, programmers, coders, etc.) begins to ideate implementation of a computer program such as an application ("app"), a diagram of the computer program is first created. For instance, members of the development team often gather in a collaborative environment such as conducting a meeting in a conference room to illustrate (e.g., draw) the diagram, for example, on a dry-erase white board. From that point, the process of converting the diagram on the white board into code structures is a manual process that typically requires sub-optimal utilization of time. For instance, the diagram drawn on the white board may need to be converted (e.g., copied) into a digital format and then be passed to developer(s) (e.g., coders, programmers). The developer(s) then spend a considerable amount of time reviewing the design architecture of the diagram to identify aspects of the diagram (e.g., the components, the structure of the components, the interactions of the components, and/or the behavior of the components). After reviewing the design architecture, the developer(s) can begin to create the code structures for the computer program (e.g., write the code from scratch). Often times, while creating the code structures, a developer is unaware and/or unfamiliar with programming features made available via a particular programming platform. For example, a developer may be unable to leverage the latest and most applicable design patterns and best practices associated with particular functionality.

SUMMARY

The techniques and systems described herein convert a visual illustration of a diagrammed computer program into equivalent, structured code solutions. The conversion can be implemented in association with any programming language such that the components in the diagram can subsequently be mapped to their equivalent, structured source code. The mapping is based on computer recognition of the components illustrated in the diagram. The mapping can also be based on computer recognition of the structure of the components illustrated in the diagram, the interactions of the components illustrated in the diagram, and/or the behavior of the components illustrated in the diagram. Once the code solutions are finalized by a developer, the source code can be compiled to verify that it executes correctly.

In various examples discussed herein, the techniques and systems implement a tool that receives a diagram of a computer program. The diagram can comprise an image (e.g., a photo of the diagram drawn on a white board that is captured by a camera) or the diagram can comprise content originally generated in electronic form (e.g., use of a computer-implemented digital drawing program to generate the diagram in a digital format). The diagram represents a design architecture of a computer program, and therefore, the diagram may illustrate individual components, as well as a structure for the individual components and interactions between the individual components. The tool is configured to recognize (e.g., optically) characteristics of the components illustrated in the diagram. In some implementations, the tool uses the characteristics to determine a programming language associated with the design architecture. Then, for individual ones of the components illustrated, the tool further uses the characteristics to associate the component with one or more code templates. A code template is pre-populated with source code of the programming language. Subsequently, the tool enables the code templates to be output (e.g., displayed) on a device associated with a user so that the user can provide input that updates and finalizes the source code.

In various implementations, the recognized characteristics used to identify the components and/or map the components to code templates can comprise keywords, visual relationships (e.g., representing interactions), and/or visual shapes. For example, a keyword can label and/or name a component so that the keyword can be used by the tool to map the component to a code template. In another example, a visual relationship can visually connect two or more components (e.g., components with an arrow drawn between, components illustrated adjacent to one another such that they are touching each other, a component visually illustrated on top of another component, a visual position of a component in a sequence of components in the diagram, spacing or a distance between two components, etc.) so that the visual connection can be used by the tool to map a component to a code template. In yet another example, a visual shape (e.g., a square, a circle, a diamond, an oval, a unique shape pre-defined for a component, etc.) can be used to distinguish a first component of a first type or classification from a second component of a second type or classification such that the visual shape can be used by the tool to map the component to a code template.

In various implementations, the tool can also use the characteristics to identify various coding options, configure a code template to present the various coding options, enable the coding options to be selected by the user, and/or recommend a coding option. For instance, the coding options can reflect the latest and most commonly used (e.g., the most popular): design patterns for particular functionality implemented in association with a particular programming language and/or best practices for particular functionality implemented in association with a particular programming language. Consequently, via the use of code templates associated with the recognized characteristics, structured code solutions can be generated efficiently. That is, a developer is not required to generate or write the code from scratch but rather review code templates with pre-populated code, update the pre-populated code, and/or make selections of coding options so that the code solutions can be finalized.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

Figure 1:
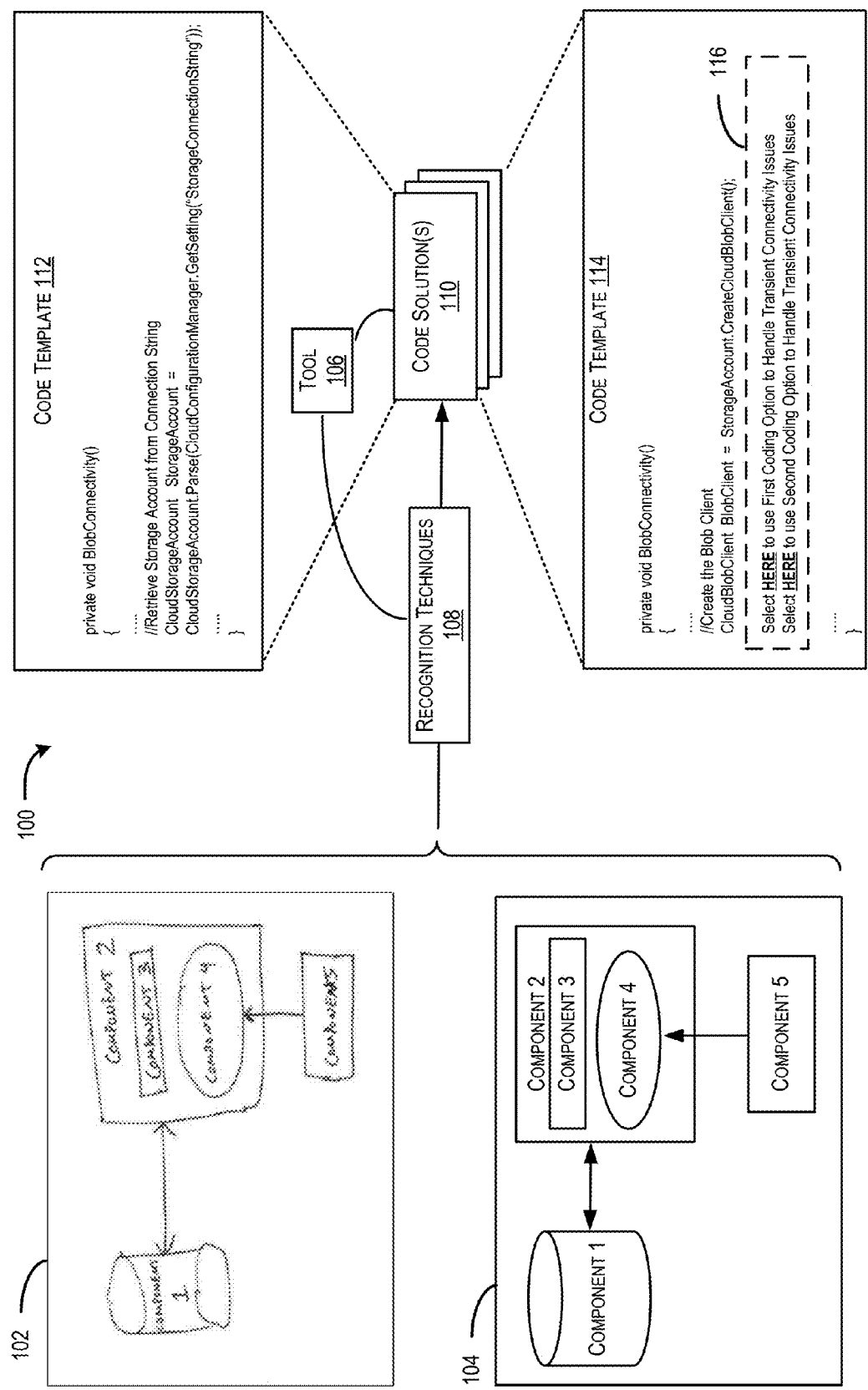
FIG. 1 is a block diagram illustrating a conversion of a diagram illustrating a design architecture of a computer program, such as an application ("app"), into code solution(s).

The techniques and systems described herein provide a tool for use in association with the development of a computer program. For instance, a computer program development team (e.g., one or more design architects, developers, programmers, coders, etc.) can use the tool to efficiently generate code solutions using an illustrated diagram (e.g., drawn on a dry-erase white board, drawn using a digital drawing program such as Microsoft® Visio®, etc.). In various examples, the tool receives a diagram illustrating the design architecture (e.g., an uploaded image that visually captures a diagram). The tool can then perform recognition techniques to identify characteristics of the components illustrated in the diagram. For instance, characteristics of an individual component can include keywords written on the component, a visual shape of the component, and visual relationship(s) between the component and other components illustrated in the design architecture. Using the identified characteristics, the tool can determine a programming language (e.g., in a human-readable format) with which the diagram is associated and/or maps the components illustrated in the diagram to previously generated code template(s).

In various implementations, an individual code template can be pre-populated with source code written in the determined programming language. The source code pre-populated in a code template can be "base" code such that it provides a good starting point for a developer to understand the functionality being coded, yet also enables the developer to make changes that are tailored to a particular computer program and/or the desires of the development team of the particular computer program. Consequently, a code template is interactive and is output (e.g., displayed) so that a developer can provide input to update the source code (e.g., modify pre-populated code, add new code, delete pre-populated code, etc.). Furthermore, a sequence of code templates can provide an initial structure for one or more code solutions required to implement the computer program being developed.

As used herein, a "component" of a diagram can represent a separate or a modular part of a computer program (e.g., an application) that contains semantically related functionality, data, hardware, or a combination thereof. For example, different components can be illustrated in a diagram to emphasize a separation of concerns for a development team (e.g., separate tasks required to be implemented so the computer program executes correctly). In some examples, a component can be associated with particular functionality of a programming platform (e.g., an integrated development environment (IDE) such as Microsoft® Visual Studio®). To this end, a component can represent software, aspects of hardware, or a combination of both software and hardware. For instance, a component can represent: a software package, a service (e.g., a web service, a networking service, a storage service, a cloud service, etc.), a resource (e.g., a web resource, a networking resource, a storage resource, a cloud resource, etc.), a device, a server, an interface (e.g., an application programming interface (API)), a debugger, an editor, and so forth. Consequently, components are used to separate a wide-range of functionality that is made available to developers via a programming platform. In some instances, the components illustrated in the diagram are labeled with a name that comprises one or more keywords to distinguish one component from another (e.g., a standard or a commonly-used name for a component).

Consequently, via the techniques and systems provided herein, an illustration of a diagram can directly (e.g., with little or no user involvement) be converted into code templates and developers do not have to concern themselves with reviewing and analyzing the design architecture to generate a robust code foundation as a starting point. Rather, by mapping the illustrated components of the diagram to code templates that are pre-populated with base code, developers are automatically provided with an initial structure from which coding can begin. Therefore, via the use of code templates, programming can be more consistent across various groups of developers and/or programming can also be of higher quality because variations in coding styles and in coding disciplines are reduced, if not made irrelevant. Even further, valuable time in the program development process is saved via the elimination of tasks, such as identifying and analyzing components of the diagram and/or generating the base code and/or initial structure required to implement code solutions for a computer program.

FIG. 1 is a block diagram 100 that illustrates a conversion of a diagram illustrating a design architecture of a computer program or a portion of a computer program (e.g., such as an "app"), into code solutions. A diagram is created (e.g., drawn) on a surface (e.g., a physical surface and/or a digital surface). For instance, the surface can comprise a white board, a chalk board, a display screen, a touch screen, a projector screen, and so forth. In a first example, the diagram can be hand-drawn 102 by a user (e.g., a developer using a white board in a conference room, a developer using a digital pen on a touch screen surface, etc.). In a second example, the diagram can be generated, by a user, using computer drawing tools 104 (e.g., generated by a user within a computer diagramming program such as Microsoft® Visio®.

As described above, a diagram can include multiple different components, where an individual component comprises a separate or modular part of a computer program that contains semantically related functionality, data, hardware, or a combination thereof. Accordingly, both the hand-drawn diagram 102 and the computer-generated diagram 104 comprise a first component (e.g., "component 1"), a second component (e.g., "component 2"), a third component (e.g., "component 3"), a fourth component (e.g., "component 4"), and a fifth component (e.g., "component 5"). In various examples, a diagram can comprise a Unified Modeling Language (UML) diagram such as a Class diagram, a Sequence diagram, an Entity-Relationship (ER) diagram, a Use Case diagram, or a combination thereof. While FIG. 1 illustrates five components in the diagram, it is understood in the context of this document that a diagram can include any number of components (e.g., one, three, eight, ten, fifteen, fifty, one hundred, and so forth).

Once drawn and submitted, a tool 106 performs recognition techniques 108 on the diagram to identify the individual components therein and characteristics of the components. For example, an image of the diagram can be captured (e.g., by a camera) and uploaded to the tool 106 so the recognition can be performed. In another example, a diagram created in a digital format can be directly uploaded to the tool so recognition can be performed (e.g., hand-drawn on a touch screen using a digital pen, generated by a user in a computer diagramming program, etc.). In various implementations, the tool 106 is configured to use optical recognition techniques (e.g., optical character recognition (OCR)), shape recognition/classification techniques (e.g., number of sides, lengths of sides, angle detection, etc.) and/or other recognition techniques to identify characteristics of the diagram.

As described above, the characteristics can comprise keywords, visual shapes, and/or visual relationships. Using the characteristics, the tool 106 can determine an intended programming language in which the design architecture of the diagram is to be implemented. Consequently, the tool 106 is configured to use the characteristics to create a semantic context corresponding to the various components in the diagram. Moreover, the tool 106 is configured to identify code templates pre-populated with source code useable to define code solution(s) 110 for the computer program.

A code template is generated and/or provided by the tool 106 as a means for a developer to efficiently and effectively: review the pre-populated code associated with an illustrated component of the diagram, provide changes to the pre-populated code associated with an illustrated component of the diagram, add to the pre-populated code associated with an illustrated component of the diagram, and/or make selections of embedded coding options configured to further import code into the code template. Therefore, a code template provides code in an intermediate form such that the code can be efficiently reviewed and revised by a developer before it is finalized, yet the developer is no longer required to create all the code from scratch.

In various examples, a keyword can label and/or name a component so that the keyword can be used by the tool 106 to map the component to a code template. In some instances, keyword(s) can include acronyms. Accordingly, each of "component 1", "component 2", "component 3", "component 4", and "component 5" illustrated in diagrams 102, 104 can comprise one or more keywords descriptive of the component. Keywords can be generally applicable to a variety of programming languages or keywords can be specifically associated with a particular programming language. Examples of keywords can include: "network", "server", "OEM" (Original Equipment Manufacturer), "package", "database", "connectivity", "web", "browser", "debugger", "editor", "account", "email", "payment", "send", "receive", "forms", "files", ".NET", "Azure", "Blob", "MVC" (Model-View-Controller), "SQL" (Structured Query Language), and so forth. The keywords can be used to associate (e.g., map) an individual component, or multiple components, with code template 112 or code template 114, which are displayed on a user device of a developer for review.

In another example, a visual relationship can visually connect two or more components so that the visual connection can be used by the tool 106 to map the component, or multiple components, to code template 112 or code template 114. For example, a visual relationship can be recognized based on the diagrams 102, 104 showing that "component 1" interacts with "component 2" (e.g., via the arrow indicating that data is exchanged in a two-way manner) and that "component 5" sends information to "component 4" (e.g., via the arrow indicating that data is only sent one way). In another example, a visual relationship can be recognized based on the diagrams 102, 104 illustrating "component 3" and "component 4" next to each other, or based on the spacing or distance between "component 3" and "component 4". In yet another example, a visual relationship can be recognized based on the diagrams 102, 104 illustrating "component 3" and "component 4" being placed over or on top of "component 2". In some instances, a visual relationship can be described using keywords (e.g., "connect", "send", "receive", "retrieve", etc.).

In yet another example, a visual shape can be used to distinguish a first component of a first type or classification from a second component of a second type or classification such that the visual shape can be used by the tool 106 to map the component to code template 112 or code template 114. As illustrated in diagrams 102, 104 the shapes can comprise squares, rectangles, ovals, or another common geometric shape. As an alternative, a visual shape can be pre-defined by the tool 106 for a specific component such as a database or a datastore (e.g., "component 1" in diagrams 102, 104).

Consequently, the characteristics of the diagram can be recognized and subsequently used by the tool 106 to map components to corresponding code templates 112, 114 as a starting point to generate and finalize (e.g., based on user review and input) code solutions 110 useable to implement the computer program or a portion of the computer program.

In various implementations, the tool 106 can also use the recognized characteristics to identify various coding options 116 and present the various coding options 116 for selection within a code template 114 on a user device. For instance, the coding options 116 can reflect the latest and most commonly used design patterns and/or best practices. A design pattern can be created and made available by a particular programming platform and can comprise a reusable solution to a commonly occurring problem within a given programming context. A best practice can also be created and made available by a particular programming platform and can comprise rules that the development community has learned over time which can help improve the quality of computer programs.

As an example, the coding options 116 in FIG. 1 are associated with different code available to handle transient connectivity issues for "BlobClient". In a specific example, a first option may be associated with a transient fault handling block (e.g., an option implemented in association with Microsoft® Azure® services) and a second option may be associated with a circuit breaker handling block (e.g., also an option implemented in association with Microsoft® Azure® services). Therefore, the coding options 116 can provide different solutions to address a same or similar issue, where each solution has advantages and disadvantages to consider depending on the design architecture of the computer program (e.g., as illustrated in the diagram). In some examples, a description of the features associated with a coding option may also be displayed to help the developer make a decision on which option to select. In some instances the tool 106 is configured to recommend a coding option (e.g., order the coding options displayed so that the first ordered coding option is a recommended option and the subsequent ordered coding options displayed are alternative options, provide a visual distinction that identifies a recommended coding option, etc.). Upon selection of an option (e.g., a user click on "HERE"), the tool 106 further imports additional code associated with the selected option into the code template 114.

Consequently, via the use of code templates 112, 114 associated with the identified characteristics that are presented to a developer, structured code solutions 110 can be efficiently finalized and verified. That is, a developer is not required to generate or write the code from scratch but rather review code templates that are pre-populated with source code, update the pre-populated source code, and/or make a selection of coding options 116 so that the code solutions 110 can be finalized.

Figure 2:
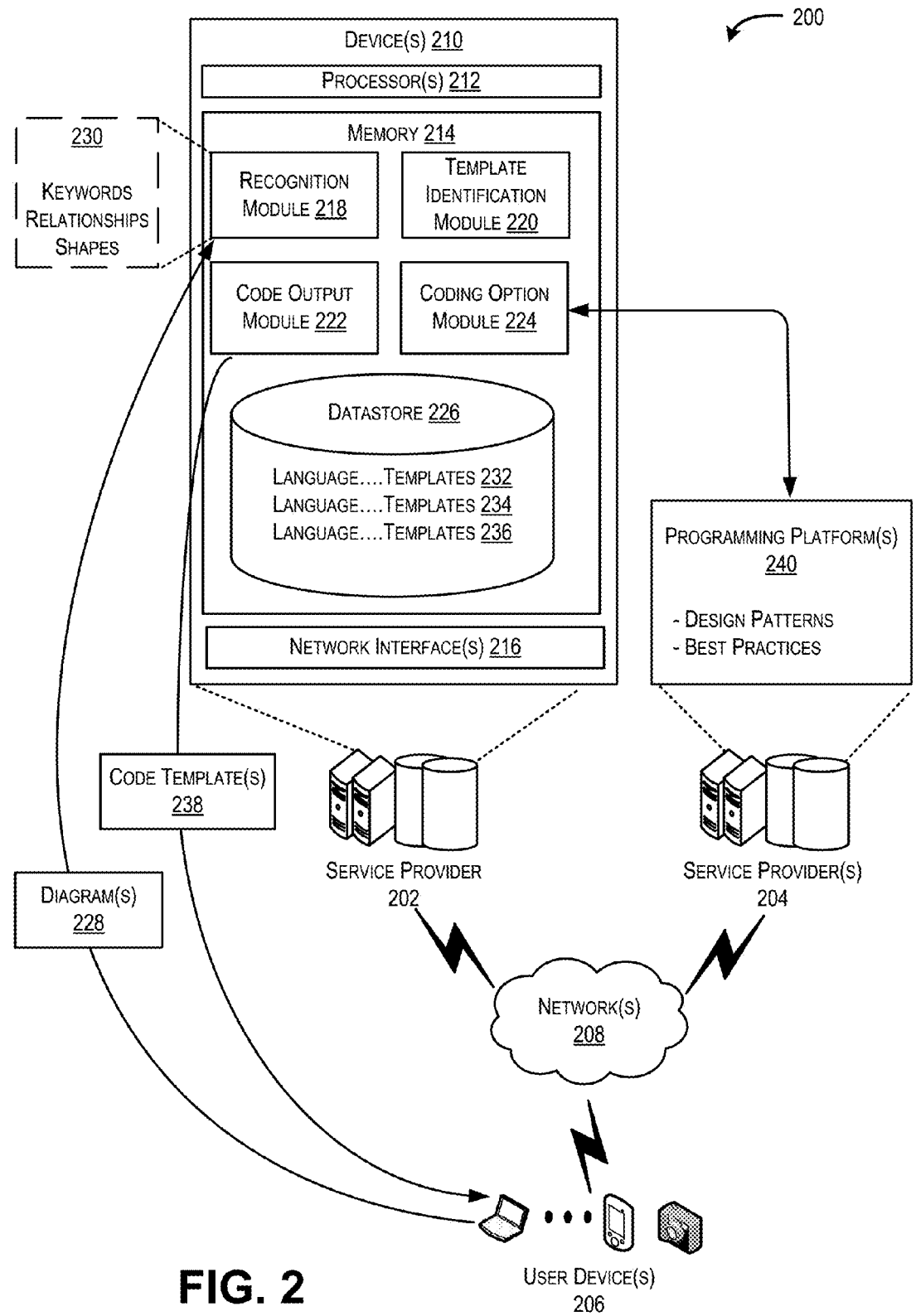
FIG. 2 is a schematic diagram depicting an example environment illustrating devices and/or modules configured to convert a diagram into the code solution(s).

FIG. 2 is a schematic diagram depicting an example environment 200 illustrating devices and/or modules configured to convert a diagram into the code solution(s). More particularly, the example environment 200 can include a service provider 202, service provider(s) 204, user device(s) 206, and network(s) 208.

The service provider 202 is configured to implement the tool described herein (e.g., the tool 106 described above with respect to FIG. 1). Therefore, the service provider 202 can comprise one or more of an entity, server(s), platform, datacenter, cloud resource, etc., that facilitates program development assistance. The service provider 202 can be implemented in a non-distributed computing environment or can be implemented in a distributed computing environment. As shown, the service provider 202 can include device(s) 210 (e.g., servers), wherein an individual device can include processor(s) 212, memory 214, as well as network interface(s) 216 so that the device 210 can communicate with the user device(s) 206 and/or the service provider(s) 204 over network(s) 208. To this end, network(s) 208 can be wired and/or wireless, comprising a wide area network (WAN), a local area network (LAN), a personal area network (PAN), a network specific to a datacenter (e.g., an Intranet, a storage area network (SAN)), a mobile telephone network (MTN), etc. Communications between devices can utilize any sort of communication protocol known in the art for sending and receiving information and/or messages, such as the Transmission Control Protocol/Internet Protocol (TCP/IP) and/or the User Datagram Protocol (UDP).

The processor(s) 212 can be a single processing unit or a number of units, each of which could include multiple different processing units. The processor(s) 212 can include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 212 can be configured to fetch and execute computer-readable instructions stored in the memory 214.

The memory 214 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 214 can also include an operating system configured to manage hardware and services within and coupled to the device 210 for the benefit of other device components and other devices. By way of example, the memory 214 can include a recognition module 218, a template identification module 220, a code output module 222, a coding option module 224, and a datastore 226, each of which is further described herein. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions.

The recognition module 218 is configured to receive, via network(s) 208, a diagram 228 from a user device 206. As described above, the diagram 228 can comprise an image (e.g., captured by a camera) of a hand-drawn diagram that is uploaded from the user device 206 to the device 210. Or, the diagram 228 can comprise content digitally formatted and uploaded from the user device 206 to the device 210 (e.g., content hand-drawn on a touch screen using a digital pen, content generated by a user in a computer diagramming program, etc.). The recognition module 218 is configured to implement recognition techniques on the diagram 228 to identify characteristics 230 of the components. The characteristics 230 can include one or more of: keywords, visual relationships, and/or visual shapes.

A user device 206 can comprise a desktop computing device, a server device, a mobile device, a laptop computing device, a tablet device, a wearable device, a game console, a media player device, a camera, or any other sort of computing device.

The template identification module 220 is configured to use the identified characteristics 230 of the diagram 228 to determine a programming language associated with the design architecture of the diagram 228. The template identification module 220 is also configured to use the characteristics to associate an individual component with one or more code templates pre-populated with source code. Accordingly, the datastore 226 stores a group of code templates 232 associated with a first programming language, a group of code templates 234 associated with a second programming language, a group of code templates 236 associated with a third programming language, and so forth. Each code template stored in the datastore 226 can be associated with one or more keywords, one or more visual relationships, one or more visual shapes, or a combination thereof. Consequently, the template identification module 220 uses the characteristics 230 of the diagram 228 to map the illustrated components to a series of code templates 238 that provide code solutions for the design architecture of the diagram 228. The code templates identified may be structured (e.g., ordered, sequenced, etc.) based on the characteristics 230 as well.

The code output module 222 is then configured to provide the identified code templates 238 to the user device 206 (e.g., cause the code templates 238 to be displayed) so that the user (e.g., a developer) can interact with the code templates 238 and efficiently and effectively: review the pre-populated code in the code templates 238, provide changes to the pre-populated code in the code templates 238, add to the pre-populated code in the code templates 238.

The coding option module 224 is configured to identify a portion of code in a code template 238 that is associated with multiple different coding options. To determine the different coding options, the coding option module 224 can interact with various programming platforms 240 hosted by devices and/or resources of the service provider(s) 204. For example, the coding options can be associated with design patterns and/or best practices that may be applicable to a computer program based on the specific design architecture (e.g., based on the components and characteristics recognized in the diagram). In various implementations, service provider 202 and service provider 204 can be the same service provider.

Figure 3:
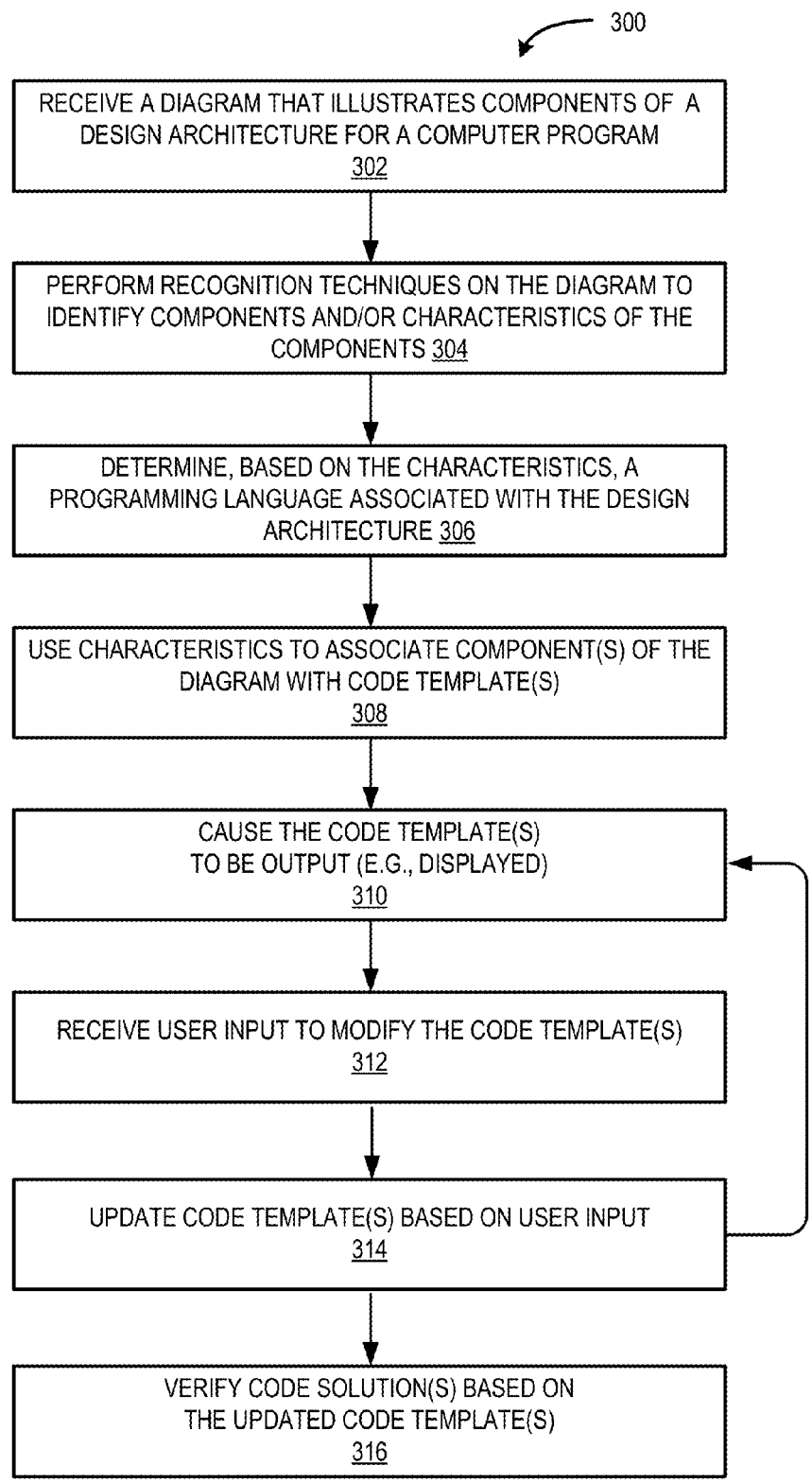
FIG. 3 is a flow diagram of an example process to convert a diagram into code solutions.
Figure 4:
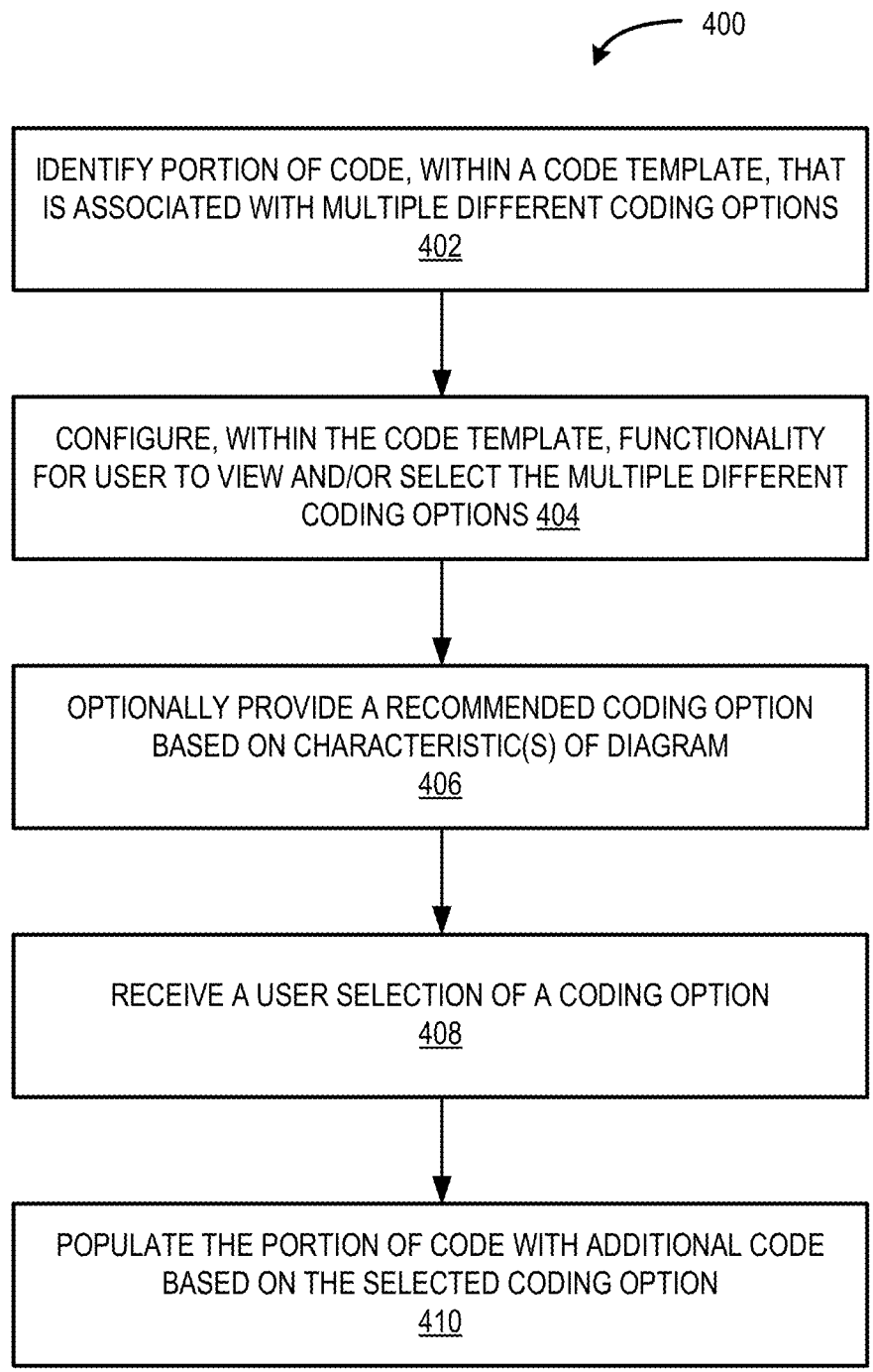
FIG. 4 is a flow diagram of an example process to provide recommended coding options for a portion of code in a code template and receive a user-selection of a selected coding option.
Figure 6:
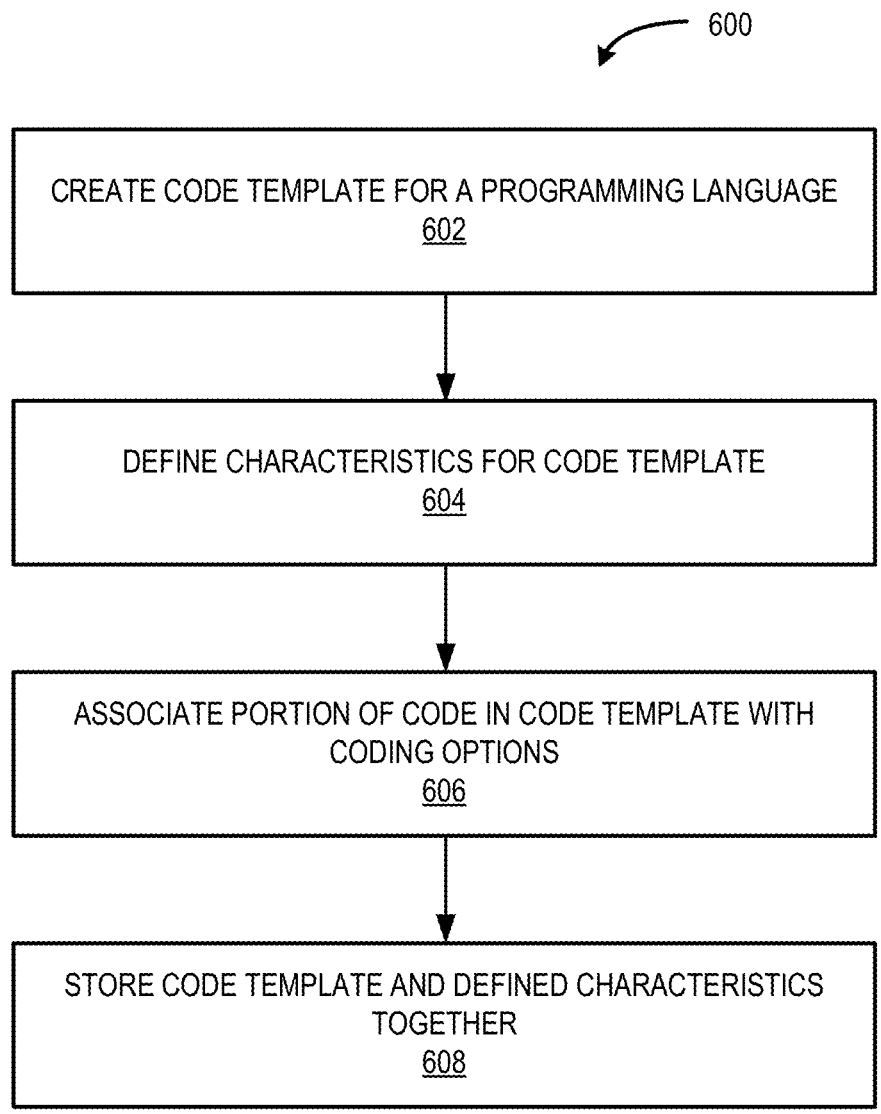
FIG. 6 is a flow diagram of an example process to create a code template and associate the code template with particular characteristics of a component (e.g., keywords, visual shape, visual relationship(s), etc.).

FIGS. 3, 4, and 6 individually illustrate an example process for employing the techniques described herein. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device or a system to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

FIG. 3 is a flow diagram of an example process 300 to convert a diagram into code solutions. The example process 300 can be implemented in association with various elements illustrated in FIGS. 1 and 2.

At 302, a diagram that illustrates components of a design architecture for at least a portion of a computer program is received. For instance, a program development team may draw a diagram on a white board, snap a picture of the diagram when it's completed, and upload the picture of the diagram to the tool 106 (e.g., the recognition module 218).

At 304, recognition techniques are performed on the diagram to identify characteristics of the components. For instance, the characteristics can include keywords, visual shapes, visual relationships, or a combination thereof.

In various implementations, at 306, a programming language associated with the design architecture of the diagram is determined. For example, the template identification module 220 can use the characteristics to associate the diagram 228 with one of the programming languages for which code templates are stored in the datastore 226.

At 308, the characteristics are used to associate the components of the diagram with code templates. For example, the template identification module 220 can recognize keyword(s) that label or name (e.g., identify) a component and use the keyword(s) to map the component to a code template or multiple code templates. In another example, the recognition module 218 can recognize a visual shape of a component and use the visual shape to map the component to a code template or multiple code templates. In yet another example, the recognition module 218 can recognize a visual relationship of a component and use the visual relationship to map the component to a code template or multiple code templates. A visual relationship can comprise: a first component visually illustrated on top of (e.g., over) a second component in a diagram, a visual connection (e.g., an arrow or a line) between a first component and a second component in the diagram, a visual position of a first component in a sequence of components in the diagram (e.g., position of a component in a flow chart), a first visual position of a first component compared to a second visual position of a second component in the diagram (e.g., a measured distance or spacing between components), or a size of a first component compared to a size of a second component in the diagram.

At 310, the code templates are output (e.g., displayed on a user device). For example, the code output module 222 can output one or more first code templates associated with one or more first components illustrated in the diagram 228 (e.g., based on the recognized structure, interactions, and behavior).

At 312, user input to modify the code templates is received. For example, a developer can interact with the displayed code templates to: review the pre-populated code, provide changes to the pre-populated code, add to the pre-populated code, and/or make selections of embedded coding options configured to further import code into the code template (as further described herein with respect to FIG. 4). In various implementations, the code output module 222 is configured to provide a visual distinction in association with areas of the code templates that need to be updated with specific code (e.g., a highlighted area).

At 314, the code templates are updated based on the user input. In various examples, upon receiving an instruction indicating that the user wants to view the next code template(s), the process returns to 310 and the code output module 222 can output, following the output of the first or previous code templates, one or more second or subsequent code templates associated with one or more second or subsequent components illustrated in the diagram 228 (e.g., based on the recognized structure, interactions, and behavior). Accordingly, the tool 106 is configured to provide the code templates for the design architecture in a structured and ordered format based on the characteristics of the components. A subset of the set of code templates output can be associated with a code solution.

At 316, once code templates that are part of a code solution are reviewed, updated, and/or approved by the user, the code solution is verified. For example, the tool 106 can analyze the syntax and semantics of the code solution and determine that the code solution will execute properly. In some implementations, the tool 106 uses an application programming interface (API) to interact with an external programming platform 240 to verify the code solution.

FIG. 4 is a flow diagram of an example process 400 to provide recommended coding options for a portion of code in a code template and receive a user-selection of a selected coding option. The example process 400 can be implemented in association with various elements illustrated in FIGS. 1 and 2, and also in association with operations 310, 312, and 314 in the example process 300 of FIG. 3.

At 402, a portion of code, within a code template, that is associated with multiple different coding options is identified. For example, the coding option module 224 can use the characteristics 230 to determine that the computer program, based on the design architecture of the diagram 228, is to implement particular functionality and that the particular functionality can be coded in more than one way. This determination can be made based on knowledge of different options provided by programming platforms 240 (e.g., in accordance with design patterns and/or best practices).

At 404, the code template is configured with functionality that enables a user to view and/or select the multiple different coding options. For example, the coding option module 224 can describe the different coding options within the relevant area of the code template so the user is informed of the different coding options (e.g., reference 116 in the code template 114 of FIG. 1).

In various examples, at 406, a recommended coding option can be provided based on the characteristics of the diagram. For example, the coding option module 224 can order the coding options displayed so that the first ordered coding option is a recommended option and the subsequent ordered coding options displayed are alternative options. In another example, the coding option module 224 can provide a visual distinction that identifies a recommended coding option. The recommendation of a coding option is further described herein with respect to FIG. 5.

At 408, a user selection of a coding option is received. For example, the user can click on a coding option to provide a selection.

At 410, the portion of code within the code template is further populated with additional code based on the selected coding option.

Figure 5:
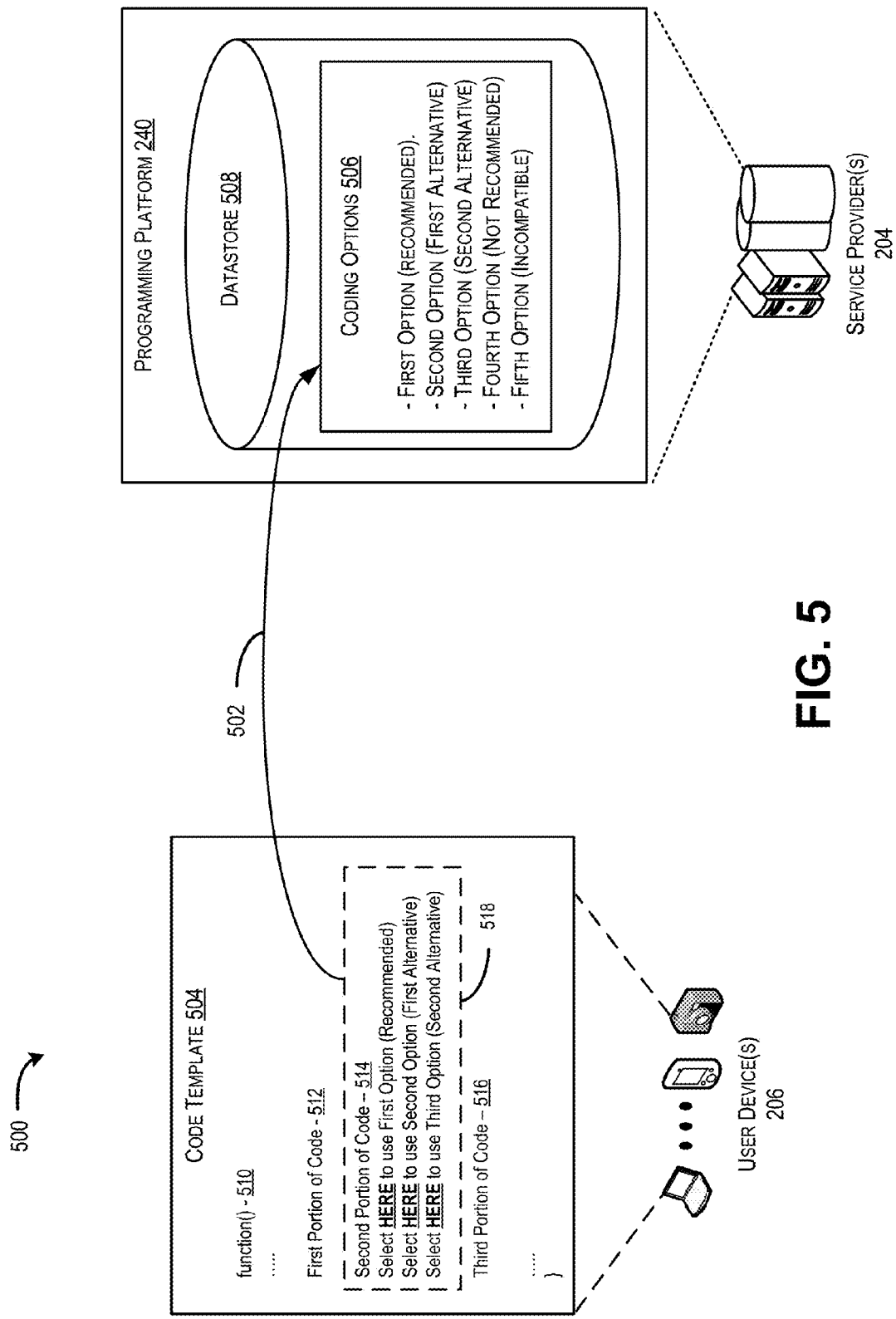
FIG. 5 is a schematic diagram illustrating an association between a portion of code in a code template and coding options that are made available for the portion of code via a particular programming platform (e.g., optimal design patterns, best practices, etc.).

FIG. 5 is a schematic diagram 500 illustrating an association 502 between a portion of code in a code template 504 (e.g., displayed via a user device 206) and coding options 506 that are made available for the portion of code via a particular programming platform 240 (e.g., optimal design patterns, best practices, etc.). An individual coding option 506 can include a description (e.g., the features, when the options should be used, etc.) and the actual code with which the code template 504 is to be populated, and the coding options 506 along with their descriptions and code are stored in a datastore 508 implemented via the service provider 204 and associated with the programming platform 240.

The code template 504 comprises a function 510, and the function comprises: a first portion of code 512 (e.g., pre-populated source code of the code template 504), a second portion of code 514 (e.g., pre-populated source code of the code template 504), and a third portion of code 516 (e.g., pre-populated source code of the code template 504). However, based on recognized characteristics 230 of a diagram 228, it has been determined that the second portion of code 514 can be implemented in various ways. Thus, the code template can provide a visual distinction of a display area 518 in which the section portion of code 514 is displayed so the user is aware that a selection can be made, or must be made to finalize a code solution.

The code template 504 can present the coding options in the display area 518. In various implementations, the code template 504 can provide a recommended coding option based on the recognized characteristics 230 of the diagram 228. For example, a first coding option in the display area 518 can be a "recommended" option. A second coding option in the display area 518 can be a "first alternative" recommended option. And a third coding option in the display area 518 can be a "second alternative" recommended option.

In some examples, the coding options presented in the code template 504 can be a subset of a larger set of coding options 506 made available via the programming platform 240. Moreover, the coding options 506 can be evaluated and ordered based on their applicability to the characteristics of a particular design architecture. That is, the first coding option presented in the display area 518 may correspond to the recommended coding option stored in the datastore 508, the second coding option presented in the display area 518 may correspond to the first alternative recommended coding option stored in the datastore 508, and the third coding option presented in the display area 518 may correspond to the second alternative recommended coding option stored in the datastore 508. These first three coding options can be recommended in a particular order, as shown. However, the datastore 508 may also include a fourth coding option that is "not recommended" and/or a fifth coding option that would be "incompatible" with a particular design architecture. Based on the evaluation, the fourth coding option and/or the fifth coding option are not presented within the code template 504 for selection by a user.

FIG. 6 is a flow diagram of an example process 600 to create a code template and associate the code template with particular characteristics of a drawn component (e.g., keywords, visual shape, visual relationship(s), etc.). The example process 600 can be implemented in association with various elements illustrated in FIGS. 1 and 2.

At 602, a code template for a programming language is created. For example, a creator of the code template can write the code to serve as the pre-populated code when the code template is used for future development of computer programs.

At 604, characteristics for the code template are defined. For example, the creator of the code template can define keywords, visual shapes, and/or visual relationships, that if recognized in a diagram, can map a component of the diagram to the code template.

In various examples, at 606, a portion of code in the code template is associated with different coding options. For example, the creator of the code template can determine that the portion of code can be implemented differently, and thus, can insert into the code template an instruction to (i) automatically select a coding option based on particular characteristics or (ii) access a programming platform 240 to identify the different coding options (e.g., in accordance with design patterns and best practices).

At 608, the code template and the defined characteristics are stored together (e.g., in the datastore 226).

EXAMPLE CLAUSES

Example A, a device comprising: one or more processors; memory; and one or more modules stored on the memory and executable by the one or more processors to: receive a diagram illustrating a design architecture of at least a portion of a computer program, the design architecture including a plurality of components; recognize characteristics of the plurality of components; determine, based at least in part on the characteristics of the plurality of components, a programming language associated with the design architecture; for individual ones of the plurality of components, associate the component with one or more code templates based at least in part on the characteristics, wherein an individual code template is pre-populated with source code of the programming language; and cause the one or more code templates to be output on a device associated with a user.

Example B, the device of Example A, wherein the diagram comprises a hand-drawn diagram and the characteristics of the plurality of components are optically recognized.

Example C, the device of Example A or Example B, wherein the one or more modules are further executable by the one or more processors to: determine that a portion of code in the one or more code templates is associated with a plurality of different coding options; configure the one or more code templates with functionality to present at least two coding options of the plurality of different coding options and to enable a selection of a selected coding option; and cause the one or more code templates to be output with the functionality on the device associated with the user.

Example D, the device of Example C, wherein the at least two coding options comprise a recommended coding option.

Example E, the device of any one of Example A through Example D, wherein an individual component represents a separate or a modular part of the at least the portion of the computer program that contains semantically related functionality.

Example F, the device of any one of Example A through Example E, wherein: the characteristics comprise keywords that label or name the plurality of components; and the component is associated with the one or more code templates based on a mapping of a keyword of the keywords to the one or more code templates.

Example G, the device of any one of Example A through Example F, wherein: the characteristics comprise visual shapes of the plurality of components; and the component is associated with the one or more code templates based on a mapping of a visual shape of the visual shapes to the one or more code templates.

Example H, the device of any one of Example A through Example G, wherein: the characteristics comprise visual relationships between the plurality of components; and the component is associated with the one or more code templates based on a mapping of a visual relationship of the visual relationships to the one or more code templates.

Example I, the device of Example H, wherein the visual relationship comprises one of: a first component visually illustrated on top of a second component in the diagram; a visual connection between a first component and a second component in the diagram; a visual position of a first component in a sequence of components in the diagram; a first visual position of a first component in the diagram compared to a second visual position of a second component in the diagram; or a size of a first component compared to a size of a second component in the diagram.

Example J, the device of any one of Example A through Example I, wherein the one or more code templates comprises a plurality of code templates and the plurality of code templates are structured based at least in part on the characteristics of the plurality of components.

While Example A through Example J are described above with respect to a device, it is understood in the context of this document, that the subject matter of Example A through Example J can additionally and/or alternatively be implemented: as a method, via executable instructions stored on one or more computer storage media, and/or by a system.

Example K, a method comprising: receiving a diagram illustrating a design architecture of at least a portion of a computer program, the design architecture including a plurality of components; recognizing, by one or more processors, characteristics of an individual component of the plurality of components; mapping the individual component to a code template based at least in part on the characteristics, wherein the code template is pre-populated with source code; causing the code template to be output on a device associated with a user; receiving, from the device associated with the user, user input that updates the source code in the code template; and updating the code template based at least in part on the user input.

Example L, the method of Example K, wherein the individual component represents a separate or a modular part of the at least the portion of the computer program that contains semantically related functionality.

Example M, the method of Example K or Example L, wherein: the characteristics comprise one or more keywords that label or name the individual component; and the individual component is associated with the code template based on a mapping of the one or more keywords to the code template.

Example N, the method of any one of Example K through Example M, wherein: the characteristics comprise a visual shape of the individual component; and the individual component is associated with the code template based on a mapping of the visual shape to the code template.

Example O, the method of any one of Example K through Example N, wherein: the characteristics comprise a visual relationship between the individual component and another component; and the individual component is associated with the code template based on a mapping of the visual relationship to the code template.

Example P, the method of any one of Example K through Example O, further comprising: configuring the code template with functionality to present at least two coding options and to enable a selection of a selected coding option; receiving, as the user input and from the device associated with the user, the selection of the selected coding option; and populating the coding template with additional source code associated with the selected coding option.

While Example K through Example P are described above with respect to a method, it is understood in the context of this document, that the subject matter of Example K through Example P can additionally and/or alternatively be implemented: via executable instructions stored on one or more computer storage media, by a device, and/or by a system.

Example Q, one or more computer storage media storing instructions that, when executed by one or more processors, cause a device to: recognize characteristics of a plurality of components illustrated in a diagram; for individual ones of the plurality of components, use the characteristics to associate the component with one or more code templates, wherein an individual code template is pre-populated with source code; determine that a portion of code in the one or more code templates is associated with a plurality of different coding options; configure the one or more code templates with functionality to present at least two coding options of the plurality of different coding options and to enable a selection of the at least two coding options; and cause the one or more code templates to be output with the functionality on a user device.

Example R, the one or more computer storage media of Example Q, wherein: the characteristics comprise keywords that label or name the plurality of components; and the component is associated with the one or more code templates based on a mapping of a keyword of the keywords to the one or more code templates.

Example S, the one or more computer storage media of Example Q or Example R, wherein: the characteristics comprise visual shapes of the plurality of components; and the component is associated with the one or more code templates based on a mapping of a visual shape of the visual shapes to the one or more code templates.

Example T, the one or more computer storage media of any one of Example Q through Example S, wherein: the characteristics comprise visual relationships between the plurality of components; and the component is associated with the one or more code templates based on a mapping of a visual relationship of the visual relationships to the one or more code templates.

While Example Q through Example T are described above with respect to computer storage media, it is understood in the context of this document, that the subject matter of Example Q through Example T can additionally and/or alternatively be implemented: as a method, by a device, and/or by a system.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. A device comprising:
   one or more processors;
   memory; and
   one or more modules stored on the memory and executable by the one or more processors to:
   receive a diagram illustrating a design architecture of at least a portion of a computer program, the design architecture including a plurality of components;
   recognize characteristics of the plurality of components;
   identify, based at least in part on the characteristics of the plurality of components, a programming language associated with the design architecture from a plurality of different programming languages;
   for individual ones of the plurality of components, associate the component with one or more code templates based at least in part on the characteristics, wherein an individual code template is pre-populated with source code of the programming language;
   determine, based at least in part on the characteristics, that a portion of code in the one or more code templates is associated with a plurality of different coding options for the programming language;
   order the plurality of different coding options for the programming language based on applicability to the design architecture to generate an ordered list of coding options;
   configure the one or more code templates with functionality to present, based on the ordered list of coding options, at least two recommended coding options of the plurality of different coding options and to enable a selection of a selected coding option; and
   cause the one or more code templates to be output with the functionality on a device associated with a user.

2. The device of claim 1, wherein the diagram comprises a hand-drawn diagram and the one or more modules are further executable by the one or more processors to optically recognize the characteristics of the plurality of components.

3. The device of claim 1, wherein an individual component represents a separate or a modular part of the at least the portion of the computer program that contains semantically related functionality.

4. The device of claim 1, wherein:
   the characteristics comprise keywords that label or name the plurality of components; and
   the component is associated with the one or more code templates based on a mapping of a keyword of the keywords to the one or more code templates.

5. The device of claim 1, wherein:
   the characteristics comprise visual shapes of the plurality of components; and
   the component is associated with the one or more code templates based on a mapping of a visual shape of the visual shapes to the one or more code templates.

6. The device of claim 1, wherein:
   the characteristics comprise visual relationships between the plurality of components; and
   the component is associated with the one or more code templates based on a mapping of a visual relationship of the visual relationships to the one or more code templates.

7. The device of claim 6, wherein the visual relationship comprises one of:
   a first component visually illustrated on top of a second component in the diagram;
   a visual connection between a first component and a second component in the diagram;
   a visual position of a first component in a sequence of components in the diagram;
   a first visual position of a first component in the diagram compared to a second visual position of a second component in the diagram; or
   a size of a first component compared to a size of a second component in the diagram.

8. The device of claim 1, wherein the one or more code templates comprises a plurality of code templates and the plurality of code templates are structured based at least in part on the characteristics of the plurality of components.

9. The device of claim 1, wherein the ordered list of coding options comprises a coding option that is not recommended based on applicability of the coding option to the design architecture.

10. The device of claim 1, wherein the ordered list of coding options comprises a coding option that is incompatible with the design architecture.

11. A method comprising:
   receiving a diagram illustrating a design architecture of at least a portion of a computer program, the design architecture including a plurality of components;
   recognizing, by one or more processors, characteristics of an individual component of the plurality of components;
   identifying, based at least in part on the characteristics, a programming language associated with the design architecture from a plurality of different programming languages;

mapping the individual component to a code template based at least in part on the characteristics, wherein the code template is pre-populated with source code of the programming language;

determining, based at least in part on the characteristics, that a portion of code in the code template is associated with a plurality of different coding options for the programming language;

ordering the plurality of different coding options for the programming language based on applicability to the design architecture to generate an ordered list of coding options;

configuring the code template with functionality to present, based on the ordered list of coding options, at least two recommended coding options of the plurality of different coding options and to enable a selection of a selected coding option;

causing the code template to be output on a device associated with a user;

receiving, from the device associated with the user, user input that selects the selected coding option; and updating the code template based at least in part on the user input so that the coding template is populated with additional source code associated with the selected coding option.

12. The method of claim 11, wherein the individual component represents a separate or a modular part of the at least the portion of the computer program that contains semantically related functionality.

13. The method of claim 11, wherein:
the characteristics comprise one or more keywords that label or name the individual component; and
the individual component is associated with the code template based on a mapping of the one or more keywords to the code template.

14. The method of claim 11, wherein:
the characteristics comprise a visual shape of the individual component; and
the individual component is associated with the code template based on a mapping of the visual shape to the code template.

15. The method of claim 11, wherein:
the characteristics comprise a visual relationship between the individual component and another component; and
the individual component is associated with the code template based on a mapping of the visual relationship to the code template.

16. The method of claim 11, wherein the ordered list of coding options comprises a coding option that is not recommended based on applicability of the coding option to the design architecture.

17. One or more computer storage media storing instructions that, when executed by one or more processors, cause a device to:
recognize characteristics of a plurality of components illustrated in a diagram that represents a design architecture;
identify, based at least in part on the characteristics of the plurality of components, a programming language associated with the design architecture from a plurality of different programming languages;
for individual ones of the plurality of components, use the characteristics to associate the component with one or more code templates, wherein an individual code template is pre-populated with source code of the programming language;
determine that a portion of code in the one or more code templates is associated with a plurality of different coding options for the programming language;
order the plurality of different coding options for the programming language based on applicability to the design architecture to generate an ordered list of coding options;
configure the one or more code templates with functionality to present, based on the ordered list of coding options, at least two recommended coding options of the plurality of different coding options and to enable a selection of the at least two coding options; and
cause the one or more code templates to be output with the functionality on a user device.

18. The one or more computer storage media of claim 17, wherein:
the characteristics comprise keywords that label or name the plurality of components; and
the component is associated with the one or more code templates based on a mapping of a keyword of the keywords to the one or more code templates.

19. The one or more computer storage media of claim 17, wherein:
the characteristics comprise visual shapes of the plurality of components; and
the component is associated with the one or more code templates based on a mapping of a visual shape of the visual shapes to the one or more code templates.

20. The one or more computer storage media of claim 17, wherein:
the characteristics comprise visual relationships between the plurality of components; and
the component is associated with the one or more code templates based on a mapping of a visual relationship of the visual relationships to the one or more code templates.

* * * * *